No. 739,624. PATENTED SEPT. 22, 1903.
P. C. TRAVER.
PACKING JOINT.
APPLICATION FILED JUNE 12, 1903.
NO MODEL.
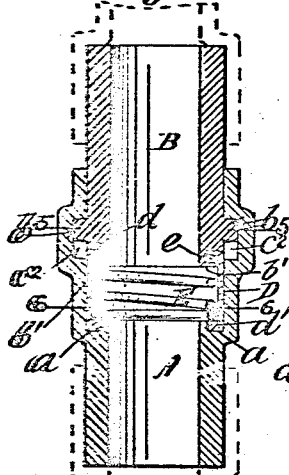
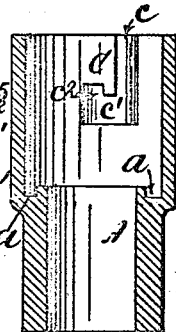
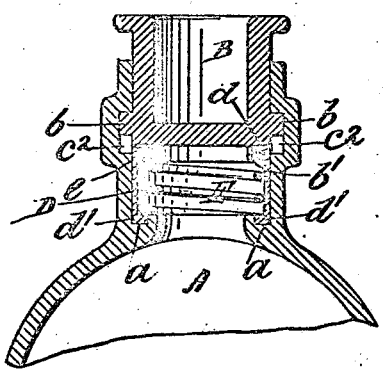
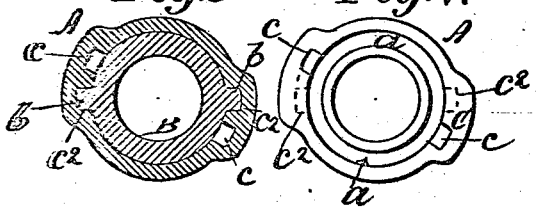
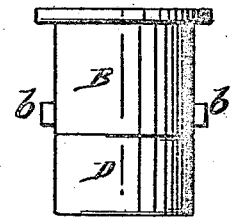
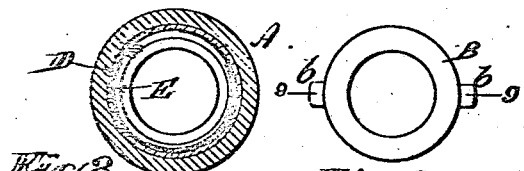
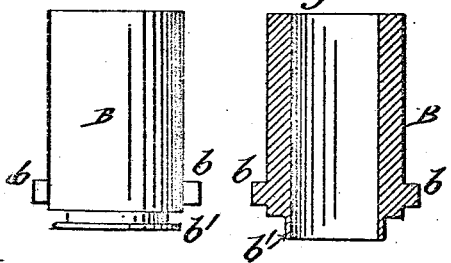
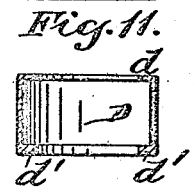
Witnesses:
Inventor:
Philip C. Traver,
By his Attorney No. 739,624. Patented September 22, 1903.

UNITED STATES PATENT OFFICE.

PHILIP C. TRAVER, OF FAR ROCKAWAY, NEW YORK, ASSIGNOR TO HIMSELF, ANDREW McTIGUE, AND JAMES McCAFFERY, OF FAR ROCKAWAY, NEW YORK.

PACKING-JOINT.

SPECIFICATION forming part of Letters Patent No. 739,624, dated September 22, 1903.

Application filed June 12, 1903. Serial No. 161,188. (No model.)

*To all whom it may concern:*

Be it known that I, PHILIP C. TRAVER, a citizen of the United States, residing at Far Rockaway, Queens county, State of New York, have invented certain new and useful Improvements in Packing-Joints, of which the following is a specification sufficient to enable others skilled in the art to which the invention appertains to make and use the same.

My invention relates to means for rendering joints between two parts to be coupled together air and water tight; and the invention consists in the special arrangement and construction of parts hereinafter described and claimed specifically.

In the accompanying drawings, Figures 1 and 2 represent, respectively, central sections of two applications of my improved form of packing-joint, the one representing a pipe or hose coupling and the other a bottle-seal. Fig. 3 is a section of the socket-piece, showing one of the bayonet-slots; Fig. 4, an end view of the socket-piece; Fig. 5, a transverse section on plane of line 5 5, Fig. 1; Fig. 6, a transverse section on plane of line 6 6, Fig. 1; Fig. 7, an end view of the coupling-piece; Fig. 8, an end elevation of the same; Fig. 9, a section upon plane of line 9 9, Fig. 7; Fig. 10, an elevation of the coupling-piece shown in Fig. 2; Fig. 11, a section of the elastic sleeve.

A and B, respectively, represent the two parts to be coupled together—as, for instance, two sections of hose or piping, as in Fig. 1, or a cork and bottle-neck, as in Fig. 2. In either case the female part or socket-piece A is formed with an annular recess $a$ and with bayonet slots or recesses C, each formed of a main channel or way $c$, a lateral extension $c'$, and a mortise $c^2$, as shown clearly in Figs. 3, 4, and 5.

The male part or coupling-piece B is formed with lugs or projections $b\ b$, adapted to fit in the recesses C C. It is also provided with an elastic hood or sleeve D, of rubber or other suitable material, in which is situated a spiral spring E. One edge $d$ of the hood or sleeve D is firmly attached to the face of the coupling-piece B, while its other edge, $d'$, is formed in the shape of an inwardly-projecting annular flange adapted to fit in the annular recess $a$ in the socket-piece A, the spiral spring being interposed between the face of the coupling-piece and the said annular flange of rubber or other elastic packing material.

A convenient way of attaching the sleeve D and the spring E to the face of the coupling-piece B is to turn in the edge $d$ of sleeve D and interpose such edge between the face of the coupling-piece and the abutting convolution $e$ of the spring, which may be secured to the coupling-piece B by a suitable means, as by turning over a flange $b'$, as indicated in Figs. 1 and 2, the edge of the sleeve D being tucked in between spring and the opposed face of the coupling.

In use the end of the coupling-piece B inserted in the socket-piece A with the lugs or projections $b\ b$ in the main channel ways $c\ c$ of the recesses C C. When the coupling-piece B has been pushed in against resistance of the spring E sufficiently to bring the lugs $b\ b$ into line with the lateral extensions $c'\ c'$ of the recesses C C, said coupling piece is turned axially until said lugs are opposite the mortises $c^2\ c^2$, when upon the release of the coupling-piece B the spring will react against the coupling-piece B and drive the lugs $b\ b$ into said mortises $c^2 c^2$, thereby locking the parts A and B together. When parts A and B are thus united, it will be seen that the pressure of the spring E is utilized in driving and holding the annular packing flange forcibly into the annular recesses thereby creating and maintaining an air water tight seal between the parts A and To uncouple the parts, it is simply necessary to push the coupling-piece inward and it slightly to release the studs $b\ b$, when coupling may be withdrawn.

What I claim as my invention, and desire to secure by Letters Patent, is—

1. In a packing-joint, the combination socket-piece formed with two or more bayonet-slots and with a recessed packing and a coupling-piece formed with lugs for engaging the bayonet-slots in said socket-piece and with an elastic sleeve inclosing a co spring together with said coiled spring, for the purpose and substantially in the manner described.

2. In a packing-joint, the combination of the socket-piece A, formed with the bayonet-slots C, C, and annular recessed packing-seat a, and the coupling-piece B, formed with the lugs b, b, elastic packing-sleeve D, and spiral spring E, arranged and operating substantially as and for the purpose set forth.

3. In a packing-joint, the combination of the socket-piece A, formed with the bayonet-slots C, C, having the grooves c, c', c², and annular packing-seat a, and the coupling-piece B, formed with lugs b, b, elastic packing-sleeve D, and spring E, for the purpose and substantially in the manner set forth.

PHILIP C. TRAVER.

Witnesses:
GEO. WM. MIATT,
D. W. GARDNER.